United States Patent [19]

Nelson

[11] Patent Number: 5,507,115
[45] Date of Patent: Apr. 16, 1996

[54] SELECTIVE APPLICATIONS OF WEED CONTROL CHEMICALS

[75] Inventor: Terrence W. J. Nelson, Saskatoon, Canada

[73] Assignee: Canadian Space Agency, Saint-Hebert, Canada

[21] Appl. No.: 191,578

[22] Filed: Feb. 4, 1994

[51] Int. Cl.$^6$ .................................................. A01M 7/00
[52] U.S. Cl. ................................................ 47/1.7; 47/1.01
[58] Field of Search ........................................ 47/1.01, 1.7

[56] References Cited

U.S. PATENT DOCUMENTS 5,144,767   9/1992   McCloy ..................................... 47/1.7
5,222,324   6/1993   O'Neall ..................................... 47/1.7
5,278,423   1/1994   Wangler .................................... 47/1.7

Primary Examiner—Henry E. Raduazo
Attorney, Agent, or Firm—David J. French

[57] ABSTRACT

A selective spraying weed control system utilizes weed detectors that process four bands of reflected illumination from a field of view that may contain weeds. The system uses distributed processes assigned individually to control associated spray nozzles.

4 Claims, 3 Drawing Sheets

SELECTIVE APPLICATIONS OF WEED CONTROL CHEMICALS

FIELD OF THE INVENTION

This invention relates to the control of weeds by chemicals. In particular, it relates to an apparatus for selectively directing weed-killing chemicals to weeds under open-field conditions.

BACKGROUND TO THE INVENTION

Environmental and economic concerns are forcing agricultural procedures to modify traditional practices to remain viable. Soil conservation, moisture conservation, and herbicide costs are the primary concerns facing the North American agricultural producer.

In most dry land farming the crops are moisture limited so that a field must be rotated, using a fallow year. The traditional practice in fallow is to use tillage to control the weeds. However in dry land conditions the use of tillage promotes moisture loss ad soil erosion. Leaving the field to stubble reduces the moisture loss and soil erosion. The stubble is useful in trapping snow during the winter, reduces the evaporation during the summer, and fixes the soil to reduce erosion.

Chemical fallow procedures use herbicides to control the weeds in stubble. Traditionally chemical weed control procedures for land in fallow require the applicator to spray the entire field. Broadcast spraying of herbicide for weed control is more expensive, in the short term, than tillage.

There is a need to detect weeds in fallow or stubble fields so that the weeds can be selectively sprayed without spraying the entire field. Current general usage does not follow this procedure. However the present invention allows the applicator to selectively spray weeds in stubble or fallow, thus reducing the cost of chemically controlled fallow.

A prior art selective sprayer product sold under the trademark Detect-Spray by an Australian company is described in U.S. Pat. No. 5,144,767.

The Detect-Spray system uses 2 narrow-band optical filters, in the near infrared and red ranges, to identify weeds. It also uses a centralized controller and is cabled using a star configuration. Identification of weeds is effected by measuring irradiance and radiance values within the field-of-view in the near infra red and red portions of the spectrum. Reflectance values in each spectrum portion are then calculated. The ratio of the two reflectance values so obtained is then used to identify if weeds (meaning predominantly green, chlorophyll-containing vegetation) are present within the field-of-view. Unfortunately, chlorophyll can be present in both "active" and "inactive" modes, and the sensitivity of this system is reduced when chlorophyll is in its inactive mode.

Another prior art reference is the Spot Shot (TM) system which uses an "electric eye" to detect any plant that is taller than a set height. The Spot Shot turns on a solenoid whenever a tall plant, presumed to be a weed, interrupts the light beam. The Spot Shot system does not detect ground hugging weeds, and generally will not work satisfactorily in standing stubble because the straw interrupts the beam.

The present invention has as its objective the provision of an improved means for identifying weeds in fallow or stubble fields, whereby weed-control chemicals may be selectively applied to such weeds.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

The invention in its broadest aspect provides a means for identifying the probable presence of weeds within the field-of-view of an optical sensor, based on reflectance values taken from bands within the electromagnetic spectrum and converted to a colour space chromatic vector to effect the assessment. The preferred four bands are those from the blue, green, red and infra-red regions.

The four reflectance values so obtained are then used to generate an extended chromatic vector that characterize the intensity, hue, saturation and infra-red content of the field-of-view. This vector is then compared within a weed detector circuit to known extended chromatic vector values that characterize the probable presence of weeds within the field-of-view to provide an indication as to whether a weed is present.

According to a further feature of the invention, individual optical sensors and weed detector circuits are associated with individual spraying means, all of such detectors being provided through a common bus with a signal from a single ambient radiation sensor unit which permits determination of the reflectance values.

Another feature of the invention is the provision of a delay means that allows for the passage of the weed sensor, followed by the weed spray nozzle over the ground, ensuring that herbicide is primarily released when the nozzle arrives at the location where weeds have been detected.

By a further feature of the invention speed sensors are installed at the outer ends of the booms carrying the spray nozzles to provide signals that compensate for the turning of the booms with the tractor.

As a further feature of the invention this same bus is used to distribute power and control signals from an operator to each weed detector circuit.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

For convenience, the invention and its variants will hereafter be referred to as the Spray Vision System.

Figure 1:
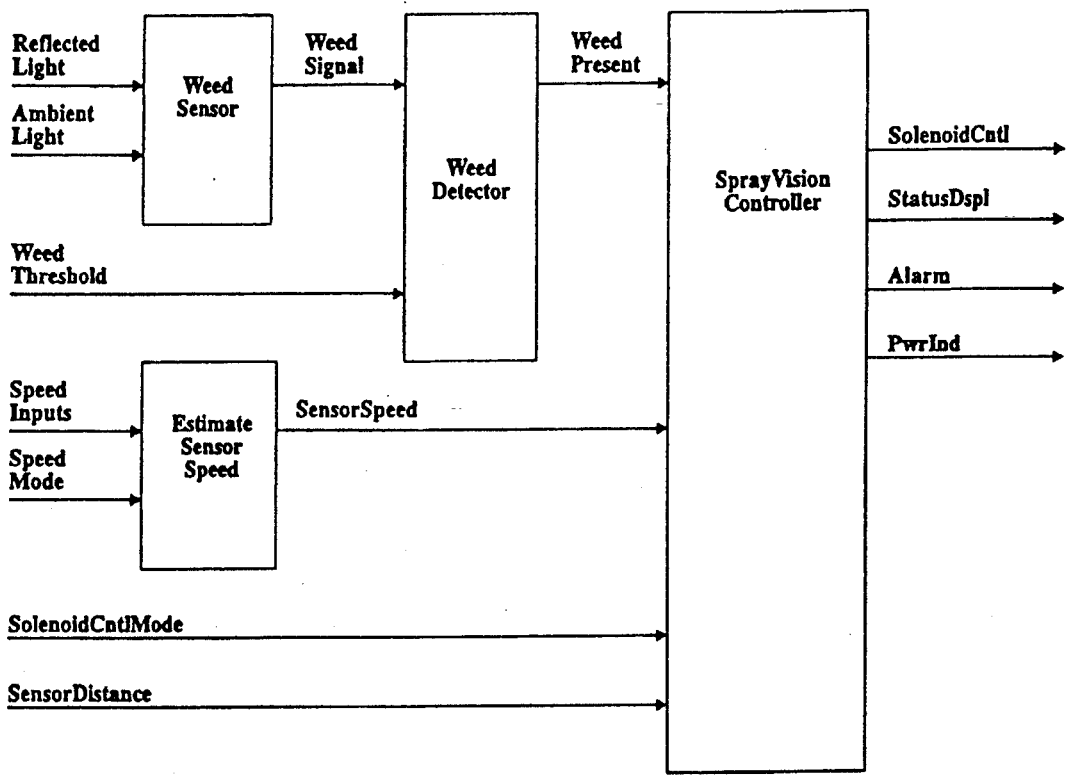
FIG. 1 is a functional block diagram of the weed detection and spray control functions of the invention.

The functional block diagram of the Spray Vision System shown in FIG. 1 provides a Weed Sensor which measures the reflected chromagraphic light (Reflected Light) and, by comparison with the ambient chromagraphic value, which provides the Weed Signal. This is done by generating a chromatic vector based on four bands of the electromagnetic spectrum. The Ambient Light is the amount of ambient light coming from the sky. The Reflected Light is the light reflected from the target area. The Weed Signal is a four dimensional vector which is used to provide an estimation of the amount of weeds in the field-of-view.

The Weed Detector compares the Weed Signal to the Weed Threshold, an internally provided comparative standard, and determines if there is enough Weed Signal to issue the Weed Present signal and effect the automatic spraying of the weeds. The Weed Threshold is an operator-adjustable level. The Weed Present signal is issued if the Weed Signal exceeds the Weed Threshold; otherwise the Weed Present signal is obtained.

The Estimate Sensor Speed function provides a signal based on the speed of the Sensor as it travels over the ground. This speed value can be provided one of three different sources; by operator input, by a speed sensor mounted on the tractor, or by measuring the speed of the boom tips as they pass over the ground. The Operator Input Speed is preferably the default speed that can be entered by the operator from the cab of the tractor. The Tractor Speed is determined by interfacing the System to the speedometer, or a groundspeed sensors at or near the tips of the boom and then calculates the speed of the sensor relative to it's position on the boom. The Speed Mode is an operator input to allow the operator to select which method of estimating speed to use. The Sensor Speed is the estimated speed of the system.

The Spray Vision Controller is a microprocessor which uses various inputs to control the operation of the solenoid (via SolenoidCntl) that releases chemical herbicide and to send status and alarm information to the operator. The Solenoid Control Mode (SolenoidCntlMode) sets the operation of the Spray Vision Controller to one of three modes (OFF, ON, and AUTO). In the OFF mode the Solenoid Control (SolenoidCntl) is forced to be off. In the ON mode the Solenoid Control is forced on. In the AUTO mode the Solenoid Control is determined by the Weed Present signal and the Sensor Distance (SensorDistance) which is the spacing between the Weed Sensor and the nozzle in the direction of travel. The Sensor Distance, Sensor Speed, and the solenoid turn-on delay are used by the Spray Vision Controller to calculate the delay between the Weed Present signal being set and when the Solenoid Control should be set. The objective of this calculation is to release the chemical herbicide from the nozzle at the moment when the nozzle passes over a weed. The delay function, and timing established by the Spray Vision Controller provides the valuable benefit of minimizing the consumption of herbicide by restricting its dispersal to substantially the area where weeds are located.

The Status Display (StatusDspl) indicates if the Spray Vision Sensor is spraying or not. The Alarm indicates if the Spray Vision Sensor or system has a problem or fault. The Power Indication (PwrInd) indicates if there is power applied to the system.

Figure 2:
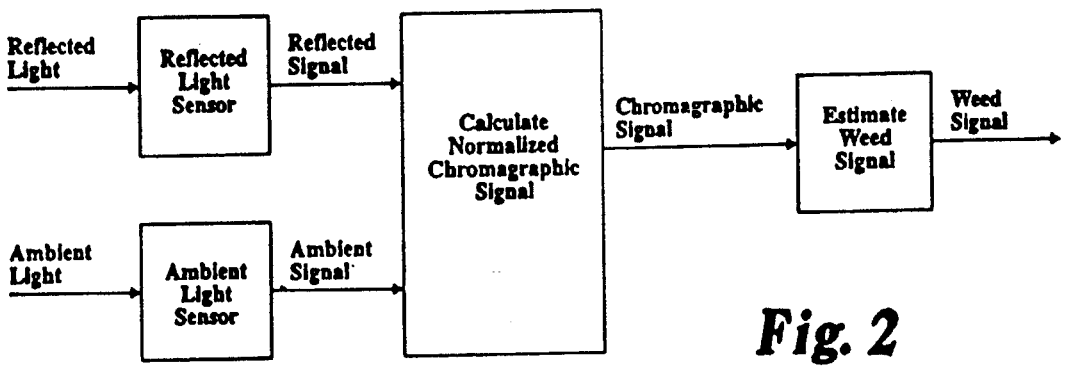
FIG. 2 is a functional block diagram of the weed sensor system.

The Weed Sensor measures the reflected chromagraphic light and the ambient chromagraphic light and calculates the Weed Signal. The functional block diagram of the Weed Sensor is given in FIG. 2.

Figure 3:
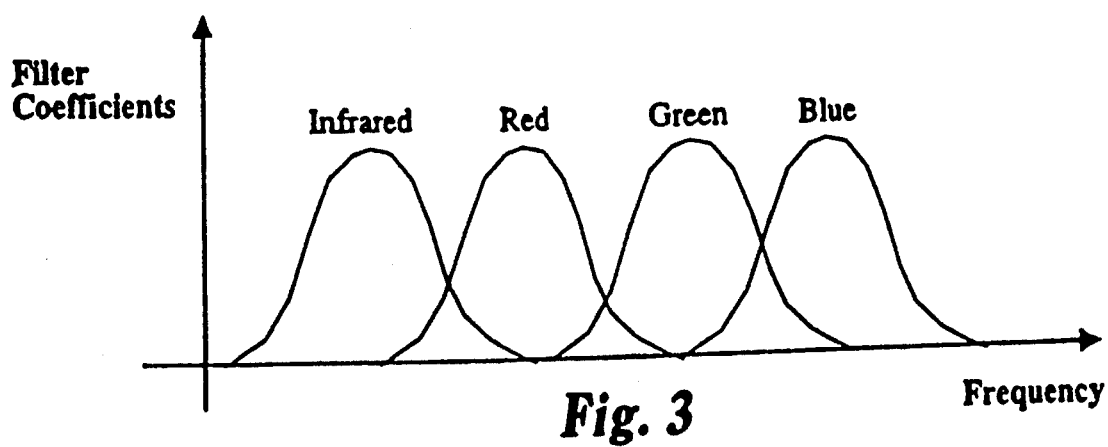
FIG. 3 is a graph of the four electromagnetic spectral bands preferred for use in the invention.

The Reflected Light Sensor separates the light reflected from the target area on the ground using 4 optical channels (IRGB: Infra-red, Red, Green, and Blue) using broadband colour separation filters that perform as shown in FIG. 3.

The Ambient Light Sensor similarly separates the ambient light from the sky into 4 optical channels (IRGB: Infra-red, Red, Green, and Blue) using broadband colour separation filters.

Figure 4:
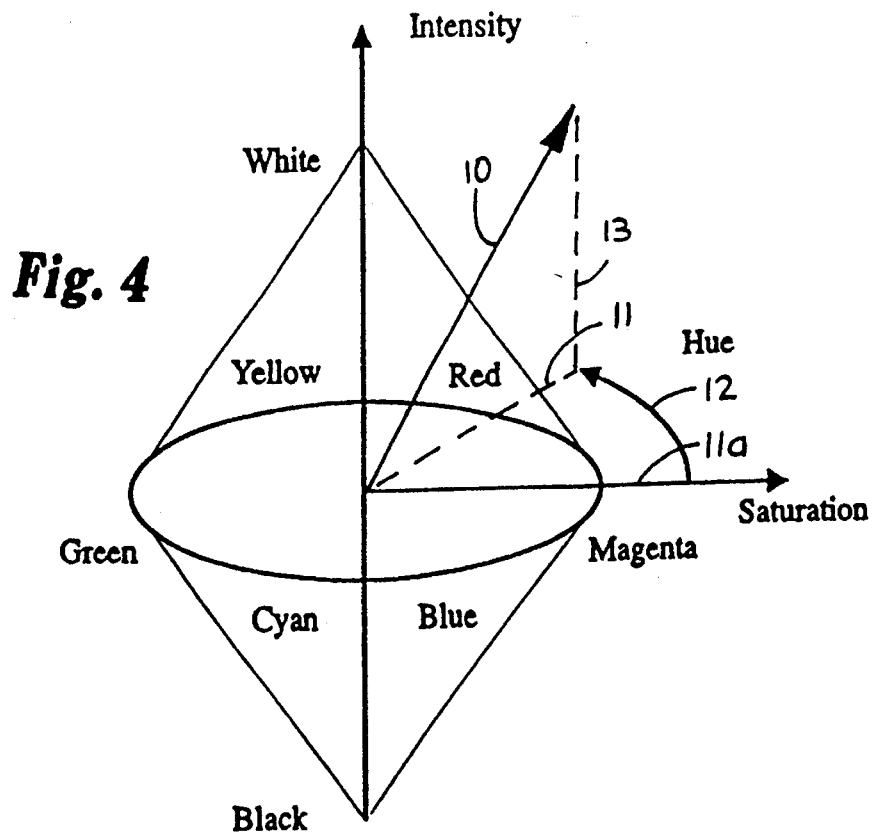
FIG. 4 is a depiction of the chromatic vector (with the infra-red component omitted) that is generated in order to detect the presence of weeds.

The Reflected Signal is normalized by dividing it by the Ambient Signal in the Normalizer Circuit to compensate for varying ambient conditions. This normalized signal, represented as an IRGB vector, is then used to generate the Chromagraphic Signal (shown in FIG. 4) which i represented as an extended chromatic (colour) vector 10 (IHSV: Infra-red, Hue, Saturation, Intensity). FIG. 4 shows the Hue, Saturation and Intensity components of the chromatic vector 10. The saturation value is equivalent to the horizontal plane component 11 of the vector 10, being equivalent in length to the portion 11a on the radial line identified as "Saturation" in FIG. 4. The angular displacement component 12 of the vector 10 corresponds to the value for "Hue". The vertical component 13 of the vector 10 corresponds to the intensity value of the vector. The infra-red component is not depicted in FIG. 4. The vector 10 is referred to as an "extended" chromagraphic vector because it includes infra-red light and not just the visible colours; the infra-red is treated as an uncoupled, orthogonal vector.

The Estimate Weed Signal (EstWeedSignal) circuit uses the Chromagraphic Signal by comparing it through a decision algorithm based on established values that correspond to the probable presence of weeds in order to generate the Weed Signal. The Weed Signal is an estimate of the level of Weed coverage in the target area. Weeds are detected by the Colour (Hue=GREEN), Saturation (Saturation=HIGH) intensity (Intensity= MEDIUM), and Infra-red (Infra-red= HIGH) signals.

The colour of the weeds is typically green and they are usually the only green objects in the field-of-view. The ground can range in colour from black, brown, red, and grey. The stubble appears as straw coloured or white in colour.

The colour saturation of the weeds tend to be higher than the ground or stubble. The ground tends to be blacks, browns, grey, and other low saturation colours. The stubble tends to be bright but the level of colour saturation is lower than plants.

The reflected intensity of the weeds tend to have a moderate level. The ground has a lower intensity because it is a good optical absorber. The stubble has a high intensity because it is a good optical reflector.

The infra-red signal of the weeds is high because the weeds are good infra-red reflectors. The stubble is also a good infra-red reflector so its infra-red signal is high. Most soils are good infra-red absorbers, but some of the clay soils and baked grey soils can be good reflectors.

By measuring all 4 chromagraphic properties the signals received from the ground and the stubble cover can be distinguished from the weeds so that the amount of weed cover can be estimated.

By using 4 broadband channels the system is more robust to variations in weeds, soils, and ambient lighting conditions because the small variations are masked by the integrating effects of the broadband filters. The 4 channels provide more information and can therefore more easily differentiate between soil types, stubble, and weeds.

Because the Spray Vision System senses the colour of the target, not simply the presence of active chlorophyll, the Spray Vision System will operate even when the chlorophyll is inactive. This means that the Spray Vision System will operate properly in the early spring, late fall, and even at night under artificial illumination.

The invention preferably uses distributed microprocessor-based sensors to detect and selectively spray the weeds in a field. The system uses a distributed communications system to allow the individual units to exchange information for added flexibility and reliability. The system is designed in a modular fashion to allow for system flexibility and low cost, mass manufactured units. A simplified physical block diagram of the Spray Vision System is given in FIG. 5.

The Spray Vision Network allows the units to communicate with each other, to send operator commands to the Sensor Units, transmit ambient light levels to the sensors, transmit the ground speed, display status and alarms to the Operator Panel, and distribute power to the units.

The Power Distribution Unit distributes power to the network from the raw 12 volt supply on the tractor. Each of the Solenoids typically requires 1 amp at 12 volts. For safety reasons the current carrying capacity of any circuit has been limited to approximately 15 amps.

Figure 5:
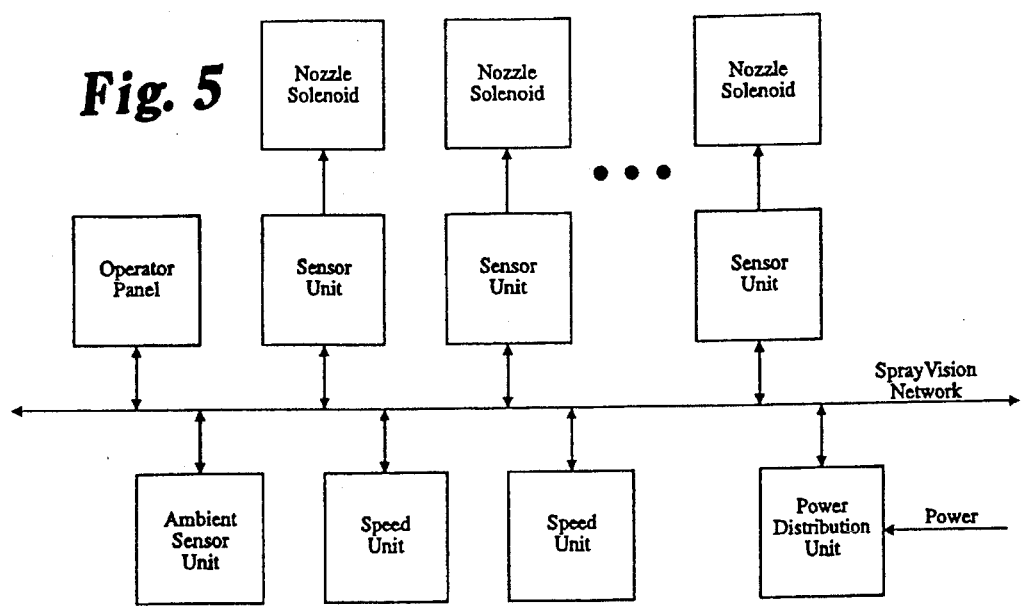
FIG. 5 is a schematic block diagram of the components of a multi-unit spray control system.
Figure 6:
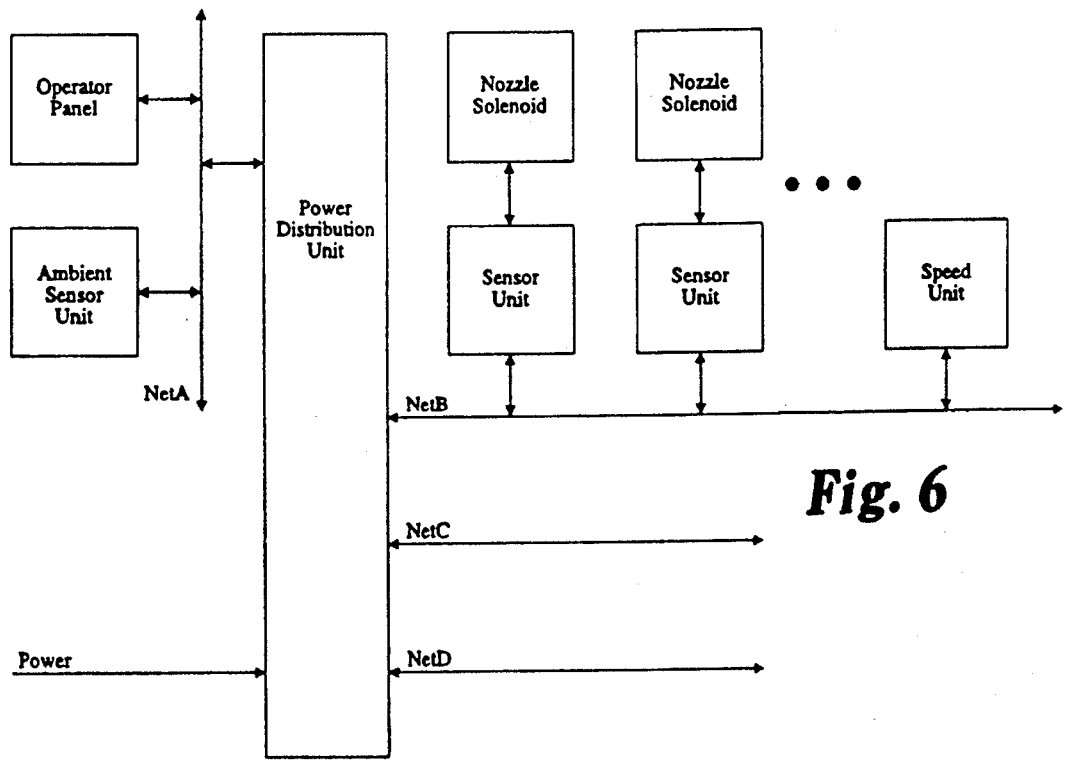
FIG. 6 is a schematic block diagram of a power distribution system for the invention.

The block diagram of FIG. 5 is reconfigured physically as shown in FIG. 6. The Spray Vision Network is functionally a single network that is physically implemented as separate distributed networks.

These distributed networks provide the ability for any unit to talk to any other unit. The connection of any sensor to any leg of the network is possible and does not interfere with the normal operation.

Network A (NetA) supports units that do not require Solenoid Power, including the Operator Panel and the Ambient Sensor Unit. Network B, Network C, and Network D (NetB, NetC, and NetD) support units that require Solenoid power.

The Spray Vision System uses a bus-style cabling system to distribute power and communications to all of the units in the system. The units are interconnected by cabling a unit to its nearest neighbour in a daisy chain fashion. The units can talk to teach other using a distributed communication system which greatly reduces the amount of cabling because all of the units can transmit on the same wires. The power is distributed to all of the units using the same cable that carries the communications; therefore there is really only one cable that interconnects all of the units. This improves the reliability and flexibility of the system. The installation time is also significantly reduced.

The Operator Panel allows the operator to control the operation of the Spray Vision System and monitor the status of the sensors. The Operator Panel is discussed in more detail further on.

The Ambient Sensor Unit detects the ambient light levels and broadcasts this information to the Sensor Units. The Ambient Sensor Unit is discussed in more detail further on.

The speed of the Unit can be optionally entered at the front panel, monitored at the tractor, or measured by the Speed Units located at, or near, the end of the booms. There are preferably 2 speed Sensors utilized, one at either end of the boom. This allows the Spray Vision Controller to compensate for tractor speed and turns. The boom-mounted Speed Units are optional and the system can operate without them using either the tractor ground speed or an operator input speed.

The Sensor Units in FIGS. 5 and 6 incorporate individually the components of FIG. 1 to detect the presence of weeds and control the associated Solenoid to selectively spray the weeds. The Sensor Unit is discussed in more detail further on.

The Spray Vision System uses a distributed control structure. Each Spray Vision Sensor contains a microprocessor that executes the decision algorithm and controls the solenoid locally. All of the relevant information required to execute the decision algorithm is transmitted to the sensor over a distributed communications system. The status and fault conditions of the sensor can be transmitted to other units using the communication system also.

A centralized controller can reduce the reliability of the system because of the amount of electrical connections, and because the centralized controller is typically more complex than the distributed controllers. The reliability of the centralized controller is typically lower than the reliability of a distributed control system because if the centralized controller fails then the entire system has failed; however if a distributed controller fails then only a small incremental portion of the system is inoperative and the rest of the system operates normally.

The Operator Panel allows the operator to control the operation of the system and to monitor the status of the system. The Operator Panel can optionally also include indicators for individual solenoid status, and alarm indicators that are more specific such as blocked nozzles, or which sensor is faulty.

The Operator Panel allows the operator to set the detection threshold to control the Sensor Units operation. The Operator can set the threshold very low so that the Sensor Unit sprays any weed detected, or the operator may select a higher threshold so that the Sensor Unit selectively sprays weeds in a more cost efficient manner.

The Ambient Sensor Unit is a full sky imager that measures the amount of ambient light in each of the optical bands. The top of the sensor uses an optical diffuser to collect the light which is then separated using broadband optical filters into 4 optical channels (Infra-red, Red, Green, and Blue). Each optical channel uses an opto-electric detector to convert the optical intensity into an electrical signal. The electrical signal is digitized by the microprocessor and converted into the ambient signal vector which is broadcast to all of the Sensor Units.

The Sensor Units detect the presence of weeds and control the Solenoid to selectively spray the weeds. The viewport on the Sensor Unit views the target area of the corresponding nozzle. The light reflected from the target area is collected and separated using broadband optical filters into 4 optical channels (IRGB: Infra-red, Red, Green and Blue). Each optical channel uses an opto-electric detector to convert the optical intensity into an electrical signal. The electrical signal is digitized by the microprocessor.

CONCLUSION

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property is claimed as follows:

1. In a chemical dispensing apparatus for applying herbicide to weeds through a spray nozzle, weed identification means for determining the probable presence of weeds within a field-of-view of an optical sensor carried by said apparatus wherein the determination of the probable presence of weeds is effected by said weed identification means based on reflectance values of the field-of-view taken from a plurality of bands within the electromagnetic spectrum, as sensed by the optical sensor, and wherein the reflectance values so obtained are used by the weed identification means to generate an extended chromatic vector that characterizes the chromatic content of the field-of-view, and includes an uncoupled, orthogonal infra-red value which vector is then compared by the weed identification means to established chromatic vector values provided therein that characterize the probable presence of weeds within the field-of-view and thereby provide an indication as to whether a weed is probably present within the field-of-view.

2. An apparatus as in claim 1 wherein the said plurality of bands are selected from the blue, green, red and infra-red regions of the electromagnetic spectrum and the chromatic vector is an extended chromatic vector that is provided with intensity, hue, saturation and infra-red values.

3. An apparatus as in claim 1 having:

(1) a plurality of individual weed identification means respectively associated each with one of a plurality of individual optical sensors and spray nozzles for herbicide carried by the dispensing apparatus on a boom having two ends and positioned transversely to the direction of travel of the apparatus over the ground; and (2) delay means associated with each weed identification means that, with the advancement of the dispensing apparatus and the passage of each optical sensor followed by the associated spray nozzle over the ground, effects release of herbicide primarily into the field-of-view where the probable presence of weeds has been detected, wherein two speed sensors are respectively installed at or near the ends of the boom to provide signals that are used by each of the delay means to compensate for the differential motion of individual nozzles over the ground when the boom is swung along an arcuate path.

4. An apparatus as in claim 2 having:

(1) a plurality of individual weed identification means respectively associated each with one of a plurality of individual optical sensors and spray nozzles carried by the dispensing apparatus, on a boom having two outer ends positioned transversely to the direction of travel of the apparatus over the ground; and (2) delay means associated with each weed identification means that, with the advancement of the dispensing apparatus and the passage of each optical sensor followed by the associated spray nozzle over the ground, effects release of herbicide primarily into the field-of-view where the probable presence of weeds has been detected, wherein two speed sensors are respectively installed at or near the outer ends of the boom to provide signals that are used by each of the delay means to compensate for the differential motion of individual nozzles over the ground when the boom is swung along an arcuate path.

* * * * *